United States Patent [19]

Stiner

[11] 4,195,793
[45] Apr. 1, 1980

[54] FISHING REEL WITH REMOVABLE ROTOR

[75] Inventor: Roy E. Stiner, Tulsa, Okla.

[73] Assignee: Brunswick Corporation, Skokie, Ill.

[21] Appl. No.: 932,451

[22] Filed: Aug. 10, 1978

[51] Int. Cl.² .............................................. A01K 89/01
[52] U.S. Cl. ................................................ 242/84.2 R
[58] Field of Search ................. 242/84.21 R, 84.21 A, 242/84.2 G, 84.5 A, 84.51 A, 84.51 R, 84.2 F, 84.2 E, 84.2 A, 84.2 R

[56] References Cited

U.S. PATENT DOCUMENTS 2,755,037  7/1956  Sarah ........................... 242/84.21 R
2,783,952  3/1957  Clay ............................. 242/84.21 R

FOREIGN PATENT DOCUMENTS 1212063  10/1959  France ............................ 242/84.21 R Primary Examiner—Billy S. Taylor
Attorney, Agent, or Firm—John G. Heimovics

[57] ABSTRACT

This invention comprehends conventional style and skirted style spinning reels wherein the front spool is keyed to a pin located in the center shaft. The spool can be easily removed and thereafter simply removing a nut permits removal of the winding cup from the body of the reel.

4 Claims, 8 Drawing Figures

FISHING REEL WITH REMOVABLE ROTOR

BACKGROUND OF THE INVENTION

1. Field of the Invention

This invention relates to conventional style and skirted style fishing reels wherein it is possible to simply remove the rotor cup from the reel without having to remove the main shaft.

2. Background of the Prior Art

It is well known in the prior art that both conventional and skirted style fishing reels have a main center shaft wherein the spool and winding cup are both mounted relative thereto. In the vast number of spinning reels the drag mechanism is located within the spool and, as such, the clicker device indicating that the drag system is operably located on the center shaft, the same shaft that the spool is mounted on. As a result the rotor which is mounted on the pinion gear associated with the crank mechanism of the reel is located just behind the spool and coaxial with the main shaft. Because the clicker device for the drag is associated on the main shaft it has been found necessary to remove the main shaft in order to remove the rotor from the pinion gear. This has proved to be a difficult problem since removal of the shaft requires taking the gear system of the reel apart. This particular problem of the prior art has been found to be troublesome to fisherman and the elimination thereof has been sought but has not been achieved.

SUMMARY OF THE INVENTION

This invention relates to conventional style and skirted style spinning reels used for fishing. The invention broadly comprehends the ability to remove the winding cup from the spool without having to disassemble the complete reel. The ability to accomplish this constitutes a major achievement over the prior art.

It is therefore an object of this invention to provide a conventional style and a skirted style fishing reel capable of having its winding cup removed without having to remove the center shaft of the reel.

Another object of this invention is to provide a locking means whereby the fishing reel spool is keyed to the center shaft with the winding cup mounted thereafter, and both being removable from the reel without having the gearing mechanism of the reel taken apart.

Yet another object of this invention is to provide a positive means for preventing the spool from rotating relative to the main shaft.

The above and other further objects and features will be more readily understood by reference to the following detailed description and the accompanying drawings.

DESCRIPTION OF THE PREFERRED EMBODIMENT

Figure 1:
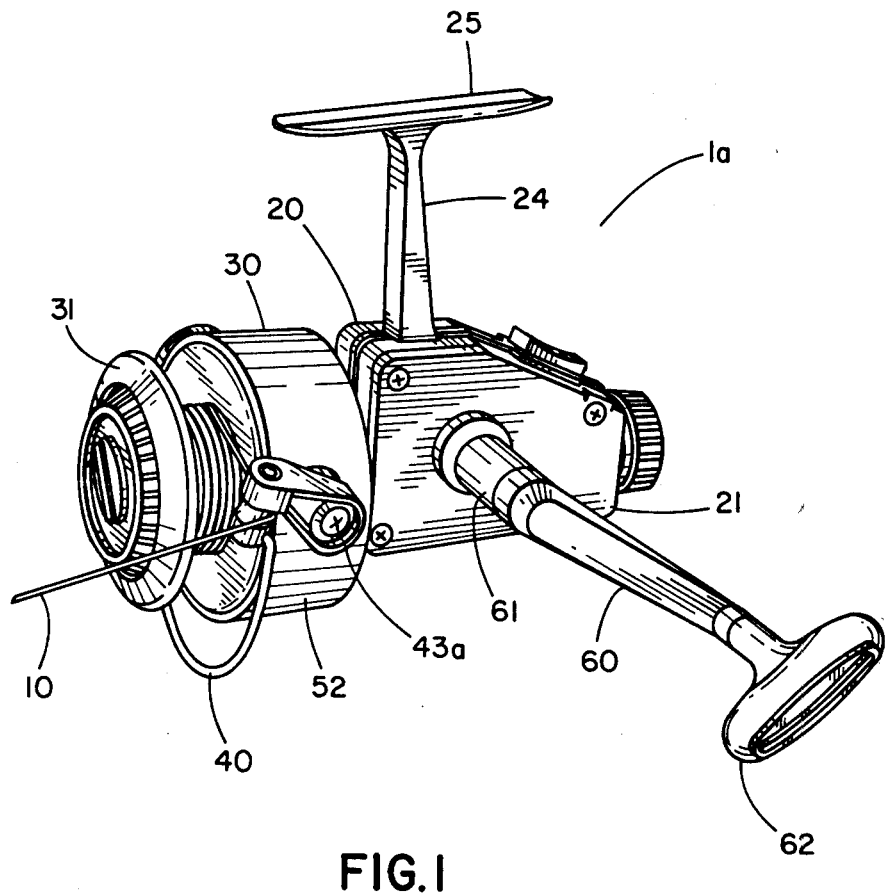
FIG. 1 is a perspective view of the conventional style spinning reel containing the invention described herein.
Figure 2:
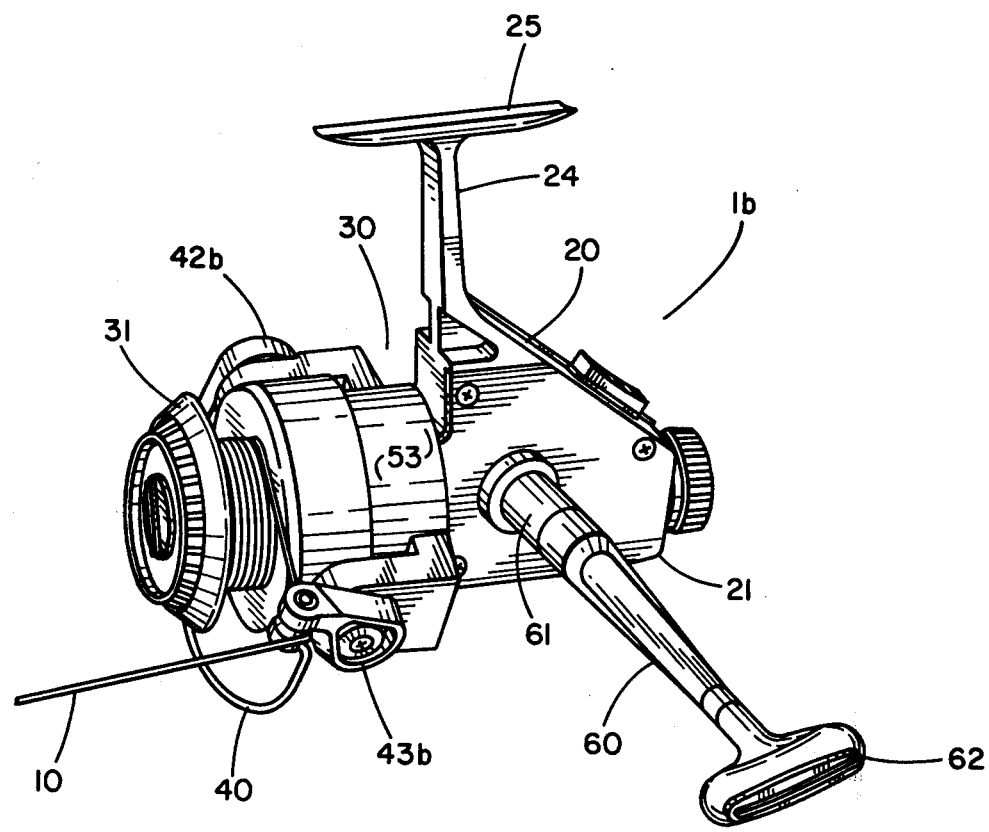
FIG. 2 is a perspective view of the skirted style spinning reel containing the invention described herein.
Figure 3:
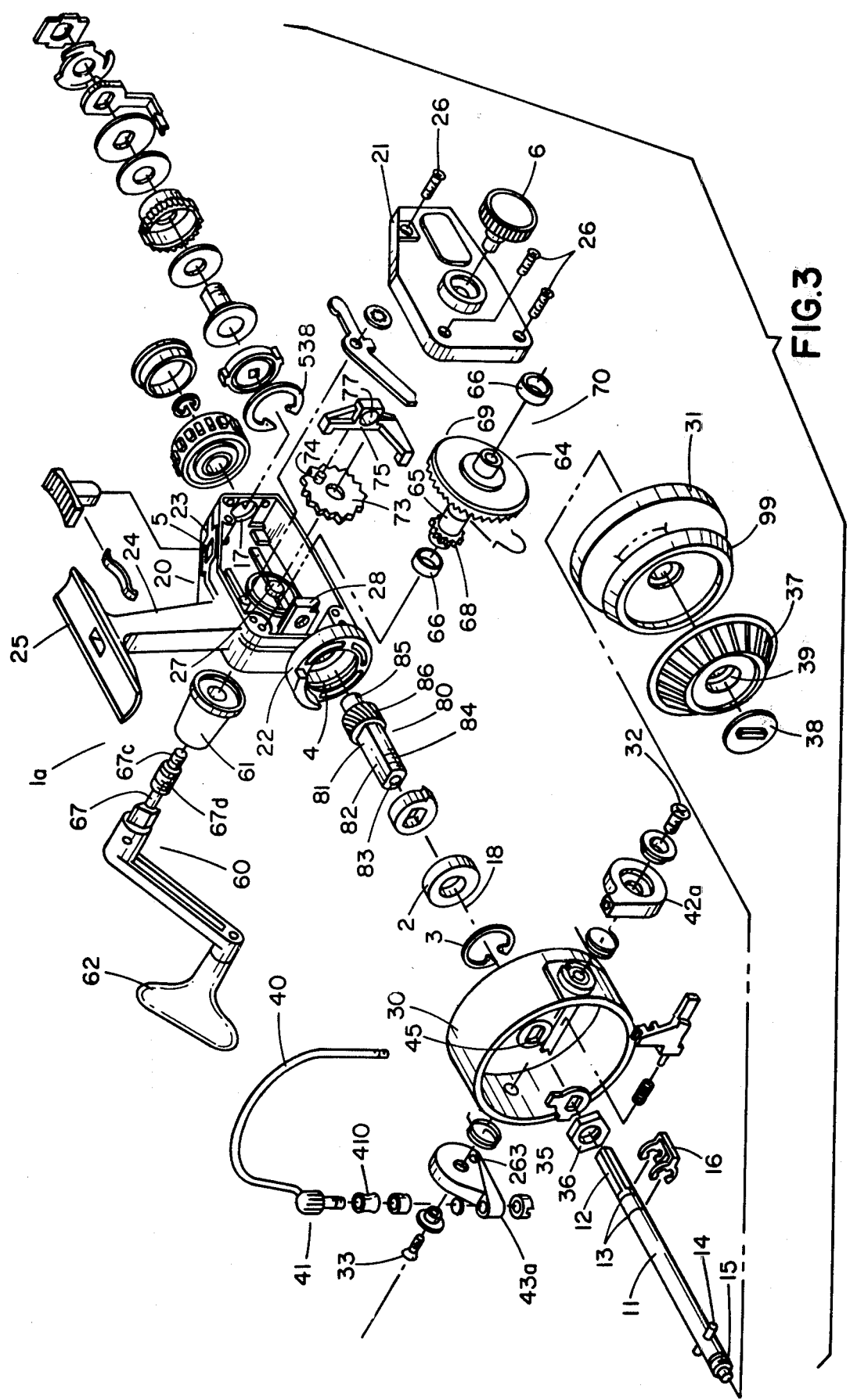
FIG. 3 is an exploded perspective view of the conventional style spinning reel containing the invention described herein.
Figure 4:
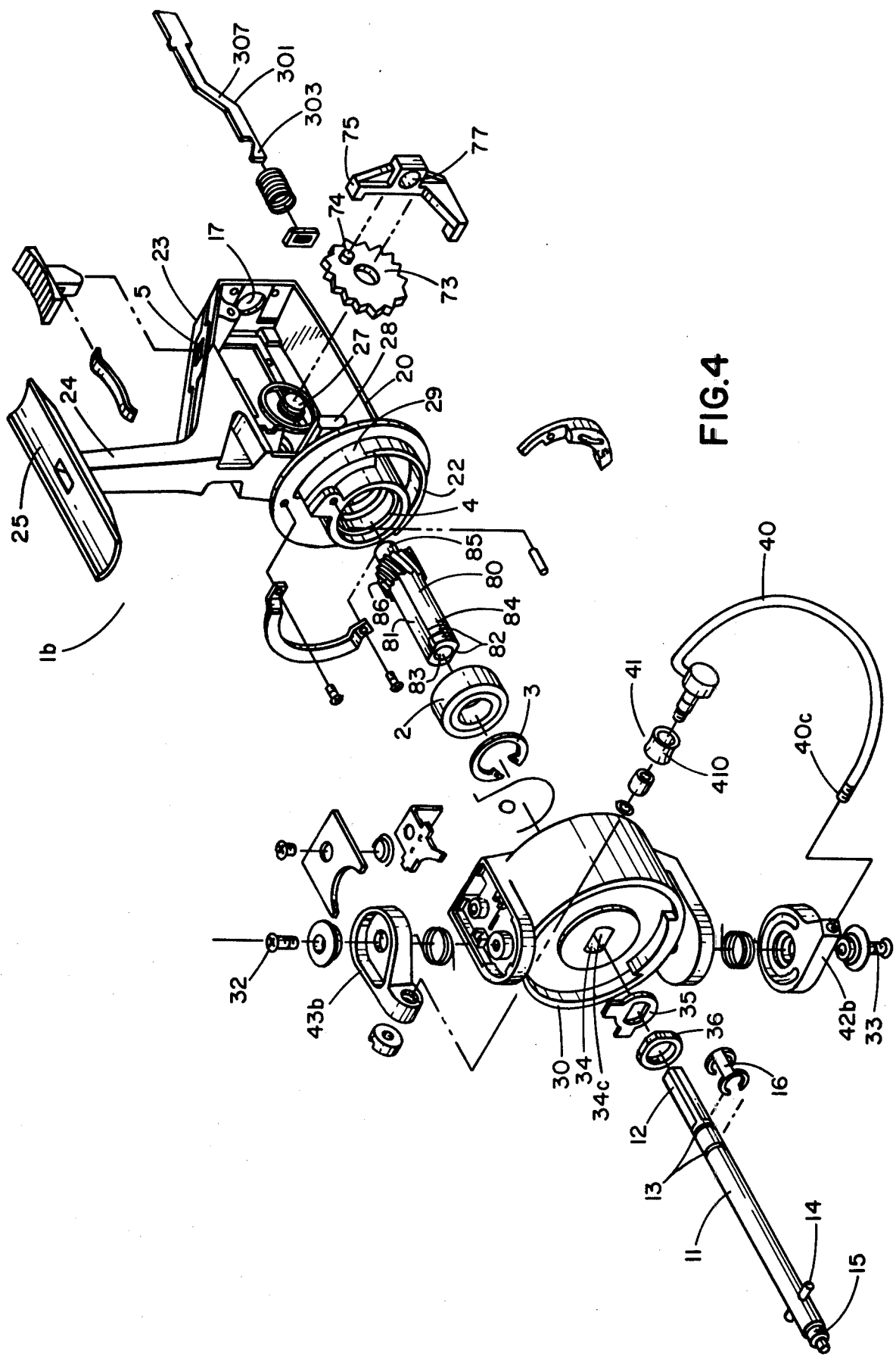
FIG. 4 is an exploded perspective view of the skirted style spinning reel not depicting some of the parts in common with the conventional reel shown in FIG. 3 but capable of incorporating the invention described herein.
Figure 6:
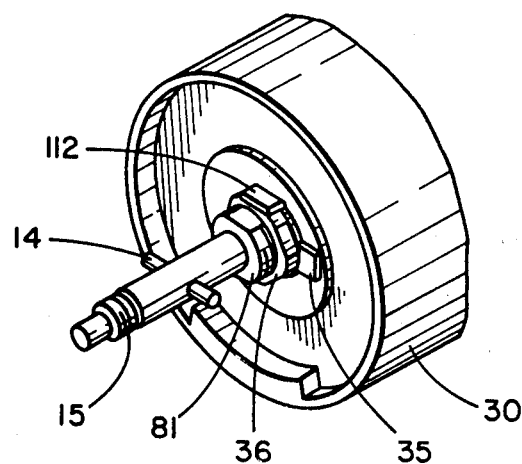
FIG. 6 is a cutaway perspective view of the reel containing the invention hereof.
Figure 5:
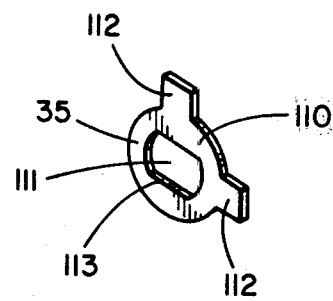
FIG. 5 is a perspective view of the embodiment of the invention.
Figure 7:
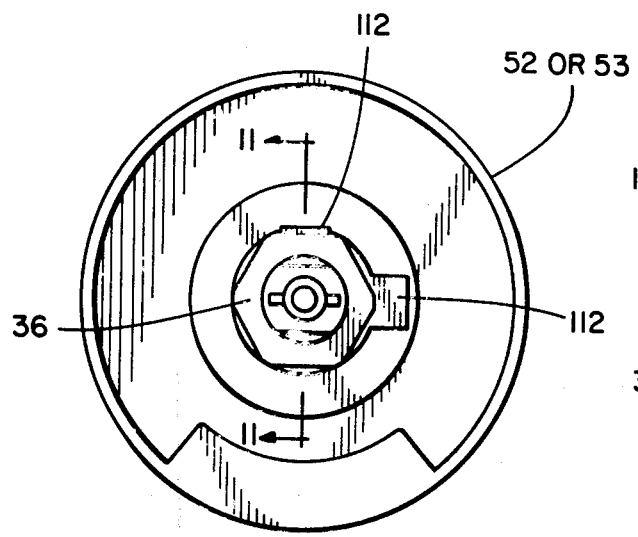
FIG. 7 is a front view of the fishing reel rotor embodying the invention hereof.
Figure 8:
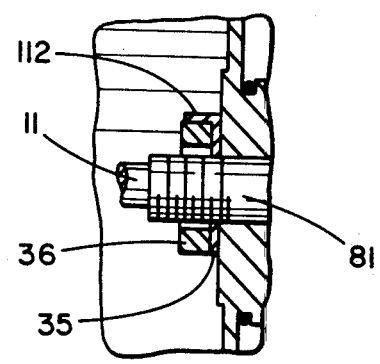
FIG. 8 is a small cross sectional view taken of FIG. 7.

In FIG. 1, a conventional style open-face fishing reel 1a is shown and in FIG. 2 a skirted style open-face fishing reel is shown. Both styles of reels function similarly, the only exception being the arrangement of the spool. As used hereinafter, the same numerals will designate the common parts for both reels; for special parts on the reels different numerical designations will be used. The reel a1 or 1b having a housing 20 which includes an integral gear case 23, a stem 24 which connects the housing to a shoe 25. The shoe 25 is used to attach the reel to spinning style fishing rods. The reel includes a crank assembly 60, rotatable about a crank shaft hub 61 with a rotatable winding handle 62 for use by a fisherman with his left hand for line retrieval while the rod (not shown) is being held by the right hand as shown in FIGS. 1 and 2 only. As will be described hereinafter, the handle 62 may be disposed on the other side of the gear case 23 for accommodating the personal desire of the user.

An axially mounted rotor housing 30 is provided and adapted to rotate about the axis of the spool 31 as the crank 60 is turned for line retrieval, with the line 10 being captured by the bail 40 passing over the line guide assembly 41 as shown. Bail 40 and line guide 41 rotate with rotor 30 and the line 10 is thereby wound on the spool 31. The shank of the screws 32 and 33 function as rotary pivot bearing points and are accordingly the centers of rotation for the bail 40 via the bail arms 42a, 42b, 43a and 43b. An internal mechanism causes the line spool 31 to reciprocate axially back and forth as the rotor 30 winds the line 10 about the spool 31; but as in spinning reels generally, the spool 31 does not rotate about its central core axis, except as controllably permitted by the adjustable free-floating drag mechansim 50. Such permitted rotation of the spool may occur during the line retrieval when a fish is on the other end of the line 10 fighting for its life while still in the water; and, thus the force of the drag friction is overcome by tension in the line. When the bail 40 is swung open from the line 10 to an open position for casting, the line 10 may freely pay out from the spool 31 over lip 99. In FIGS. 1, and 2, the bail 40 is shown in the "closed," "retrieve," or "rewind" position. The line guide roller 410 is preferably rotatable, that is, it is preferably a miniature pulley to reduce the sliding friction which might otherwise cause line wear.

In paying out the line 10 over the lip 99 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

In the overall arrangement of the reel a cover plate 21 is secured to the gear case 23 by screws 26. Inside the gear case 23 is a gear assembly 70 that is rotatable by rotating the handle 62 about the hub 61. Oscillator gear 73 is rotatably mounted on stub shaft 27 which may be part of the interior of the housing gear case 23 or secured separately thereto. Gear 73 has an inwardly projecting plug 74 that fits into groove 76 of oscillator slide 75. Rotation of the gear 73 causes the slider 75 to slide forward and backward. Crank shaft gear assembly 64 has a tubular center shaft 65 that is journal mounted in bearings 66 in gear case 23 (partly shown) and in cover plate 21. The shaft 65 has an internal right hand thread that mates with the right hand thread 67c of shaft 67 on one side and a left hand thread that mates with left hand thread 67d when the shaft is placed on the other side of the reel. This dual threaded system enables the reel to be cranked both from the right hand and the left hand. The open end of the shaft 65 (the end which the shaft 67 is not inserted) is closed off by inserting screw cap 6 exterior of the gear case 23.

Small gear 68 meshes with gear 73 as the handle 62 rotates the shaft 67 thus providing the back and forth sliding motion to slider 75. A pinion gear assembly 80 is forwardly rotatably journal mounted in bearing 2 that is mounted in the forward section 22 of the housing 20 and secured there by bearing retainer 3 which fits into groove 4. The assembly 80 has a forward shaft 81 with oppositely spaced flats 82 thereon, a central bore 83, a forward threaded portion 84, a rearwardly projecting bearing stud 85 and a gear 86. The bearing stud 85 fits into bearing mount 28 which is part of housing 20. Thus, the pinion assembly 80 has two-point bearing support. The larger gear 69 engages pinion gear 86 causing it to rotate.

The center shaft 11 has back square portion 12, undercut grooves 13, front pin 14 which press fit into the shaft 11 and front threaded portion 15. The shaft 11 slip fits into the pinion bore 83 and is supported thereby. The shaft 11 also fits through the hole 77 in slider 75. Special clip 16 fits around the hole 77 and slides into grooves 13 locking the shaft 11 to the slider 75. Thus, when the slider oscillates back and forth the shaft 11 also moves back and forth with respect to the forward section 22 of the housing 20.

The rotor 30 is mounted on the forward portion 81 of assembly 80. In a preferred embodiment the hole 34 with flats 34c is sufficiently large to pass over the pin 14 and then tighten on the forward threaded portion 84 by the use of tang 35 and nut 36; the respective flats 82 and 34c operable with each other. The hole 111 in the tang 35 and the internal diameter of the nut 36 are also larger than the length of the pin 14. The spool 31 fits over the shaft 11 with the spool retainer knob that is retained near the lip 99 having an internal threaded portion 39 that tightens down on thread 15. Thus, as the handle 62 turns the crank shaft 67, the gear assembly 64 causes the pinion assembly 80 to rotate which in turn causes the rotor 30 to rotate. At the same time rotation of gear 73 causes the slider 75 to reciprocate back and forth which causes the shaft 11 to move back and forth, so that line 10 can be wound during the retrieve mode in an orderly and uniform fashion on spool 31.

Although specific embodiments of the invention have been described, many modifications and changes may be made in the fishing reel without departing from the spirit and scope of the invention as defined in the appended claims.

What is claimed is:

1. In an open face spinning reel used for casting a bait attached to a fishing line and for retrieving the bait and fishing line after casting, the reel having a housing, a center shaft mounted in the housing, a spool mounted on the shaft for holding the fishing line, a pinion gear assembly rotatably journaled near the center and in the forward portion of the housing, the assembly coaxial with the center shaft and having a bearing stud at one end and a threaded portion at the other end, a handle and gear train assembly mounted on the housing and operable with the pinion assembly, a rotor coaxially mounted on the threaded portion of the pinion assembly and rotatable by cooperative movement of the handle and assembly, and a movable bail mounted on the rotor having an open casting position and a closed retrieving position, the spool being positioned in place on the shaft by a shaft pin passing there through and being perpendicular thereto, a nut used to secure the rotor to the threaded portion; the improvement of removing the rotor directly from the housing comprising:

(a) a shaft pin having a length that is less than the internal diameter of the nut.

2. The reel of claim 1 wherein the pin is pressed into the shaft.

3. The reel of claim 1 wherein the shaft and the pin are metal.

4. The reel of claim 1 wherein the edges of the pin are slightly rounded.

* * * * *